United States Patent
Ise et al.

(10) Patent No.: US 11,206,858 B2
(45) Date of Patent: *Dec. 28, 2021

(54) SEPARATED LIQUID SEASONING

(71) Applicant: KAO CORPORATION, Tokyo (JP)

(72) Inventors: Akihiro Ise, Koganei (JP); Tomoya Tsukamoto, Kawasaki (JP)

(73) Assignee: KAO CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/095,216

(22) PCT Filed: Apr. 19, 2017

(86) PCT No.: PCT/JP2017/015657
§ 371 (c)(1),
(2) Date: Oct. 19, 2018

(87) PCT Pub. No.: WO2017/183651
PCT Pub. Date: Oct. 26, 2017

(65) Prior Publication Data
US 2019/0133169 A1  May 9, 2019

(30) Foreign Application Priority Data
Apr. 20, 2016 (JP) .............................. JP2016-084769

(51) Int. Cl.
*A23L 27/60* (2016.01)
*A23D 7/005* (2006.01)

(52) U.S. Cl.
CPC ............ *A23L 27/60* (2016.08); *A23D 7/0053* (2013.01); *A23D 7/005* (2013.01); *A23V 2002/00* (2013.01)

(58) Field of Classification Search
CPC ....... A23L 27/60; A23D 7/0053; A23D 7/005; A23V 2002/00
See application file for complete search history.

(56) References Cited

U.S. PATENT DOCUMENTS

| 2009/0130260 A1* | 5/2009 | Reglero Rada ........ A23D 9/007 426/61 |
| 2011/0111055 A1* | 5/2011 | Lang .................... A61K 31/202 424/638 |
| 2014/0023712 A1 | 1/2014 | Helgason et al. |
| 2015/0159117 A1 | 6/2015 | Kano et al. |
| 2016/0165914 A1 | 6/2016 | Matsuda et al. |
| 2016/0255852 A1* | 9/2016 | Kato ....................... A23D 9/007 |
| 2016/0316810 A1* | 11/2016 | Terp ......................... A23C 3/08 |
| 2018/0084813 A1* | 3/2018 | Derohanes .............. A23L 33/10 |

FOREIGN PATENT DOCUMENTS

| CA | 2 930 510 A1 | 5/2015 |
| CN | 104470373 | 3/2015 |
| CN | 104911027 | 9/2015 |
| CN | 105228460 | 1/2016 |
| EP | 1 842 429 A2 | 10/2007 |
| JP | H09-176679 | 7/1997 |
| JP | 11-228838 A | 8/1999 |
| JP | 2004-204212 A | 7/2004 |
| JP | 2007-185138 A | 7/2007 |
| JP | 2010-162049 A | 7/2010 |
| JP | 2010-535526 A | 11/2010 |
| JP | 2013-159730 A | 8/2013 |
| JP | 2013-209436 A | 10/2013 |
| JP | 2015-2740 A | 1/2015 |
| JP | 2015-97486 A | 5/2015 |
| WO | WO 2013/172348 A1 | 11/2013 |
| WO | WO 2015/072406 A1 | 5/2015 |
| WO | WO 2015/095545 A1 | 6/2015 |

OTHER PUBLICATIONS

International Search Report dated Jul. 25, 2017 in PCT/JP2017/015657 filed Apr. 19, 2017.
Hirotsugu Kido, "Rosemary Extract—Need to Extend Shelf of Life in Foods—," Oleoscience, vol. 4, No. 10, 2004, 9 Pages (with partial English language translation).
Extended European Search Report dated Sep. 9, 2019, in Patent Application No. 17785989.9, 14 pages.
Abd El-Baky, H. H. et al., "Production of antioxidant by the green alga *Dunaliella salina*", International Journal of Agriculture & Biology, XP055613843, vol. 6, No. 1 Jul. 4, 2014, 10 pages.

* cited by examiner

*Primary Examiner* — Cephia D Toomer
(74) *Attorney, Agent, or Firm* — Oblon, McClelland, Maier & Neustadt, L.L.P.

(57) ABSTRACT

Provided is a separated liquid seasoning in which deterioration of taste and flavor with the storage is suppressed. A separated liquid seasoning comprising the following components (A), (B), and (C) blended therein: (A) ω3 fatty acids derived from a fat or oil, in an amount of from 3 to 20% by mass; (B) rosmarinic acid; and (C) reduced glutathione, wherein (D) a phospholipid is blended in an amount of 40 ppm or less in the emulsified liquid seasoning.

21 Claims, No Drawings

SEPARATED LIQUID SEASONING

FIELD OF THE INVENTION

The present invention relates to a separated liquid seasoning.

BACKGROUND OF THE INVENTION

In recent years, interest in health has increased, and attention has been focused on the physiological functions of polyvalent unsaturated fatty acids (hereinafter, referred to as "PUFA") typified by ω3 fatty acids.

PUFA have many unsaturated bonds, and therefore PUFA-rich fats or oils have low stability particularly to heat and light and easily generate a bad odor. Therefore, usually, antioxidants are contained in fats or oils to prevent the deterioration of taste and flavor of the fats or oils during storage.

As antioxidants for fats or oils, tocopherol, ascorbic acid, ascorbic acid fatty acid esters, lecithin, and the like are widely used. For example, Patent Literature 1 discloses a composition comprising an LC-PUFA-containing oil and lecithin in which lecithin is added in a weight ratio of lecithin to LC-PUFA of at least about 25:75.

In addition, rosemary extract is also known to have high antioxidant properties, and for example, a lipophilic antioxidant containing bayberry extract, rosemary extract, and the like (Patent Literature 2), and an antioxidant comprising rosemary extract in which the amount of hexanal and also the amounts of carnosol and carnosic acid as antioxidant components are adjusted (Patent Literature 3) are reported.

Meanwhile, glutathione is a tripeptide present in vivo and is known to be involved in antioxidation in cells and the detoxification of cells. Regarding use for edible fats or oils, an oil-soluble antioxidant obtained by treating a water-soluble antioxidant component such as glutathione or a catechin with hydrophilic and lipophilic emulsifiers to form an emulsion (Patent Literature 4) is reported.

(Patent Literature 1) JP-A-2010-535526
(Patent Literature 2) JP-A-2007-185138
(Patent Literature 3) JP-A-2004-204212
(Patent Literature 4) JP-A-2013-159730

SUMMARY OF THE INVENTION

The present invention provides a separated liquid seasoning comprising the following components (A), (B), and (C) blended therein:
(A) ω3 fatty acids derived from a fat or oil, in an amount of 3 to 20% by mass;
(B) rosmarinic acid; and
(C) reduced glutathione,
wherein (D) a phospholipid is blended in an amount of 40 ppm or less in the separated liquid seasoning.

In addition, the present invention provides a method for producing a separated liquid seasoning, comprising a step of blending (A) ω3 fatty acids derived from a fat or oil, (B) rosmarinic acid, and (C) reduced glutathione, and (D) phospholipid as needed, wherein
an amount of the component (A) blended is from 3 to 20% by mass based on a total mass of all raw materials blended, and an amount of the component (D) blended is 40 ppm or less based on the total mass of all the raw materials blended.

DETAILED DESCRIPTION OF THE INVENTION

However, particularly in a separated liquid seasoning containing an oil phase and an aqueous phase using an ω3 fatty acid-rich fat or oil as an oil phase, the oxidation of the fat or oil is likely to be promoted over time by oxygen in air and by the presence of the aqueous phase, and taste and flavor retention during storage is not sufficient even by the conventional methods.

Therefore, the present invention provides a separated liquid seasoning in which deterioration of taste and flavor with the storage is suppressed.

The present inventors have produced separated liquid seasonings in which the ω3 fatty acid-rich fats or oils are blended, and studied their taste and flavor retention. As a result, they found that when rosmarinic acid and reduced glutathione are blended, the deterioration of the taste and flavor of the separated liquid seasoning over time can be suppressed. In addition, the present inventors surprisingly found that when a large amount of a phospholipid is contained in a seasoning, not only are the oil phase and the aqueous phase less likely to return to the separated state after use (shaking), but deterioration is likely to proceed to generate a deterioration odor and a bad odor. Under these circumstances, the present inventors found that when the blended amount of the phospholipid is reduced to a certain amount or less, a separated liquid seasoning having a good taste and flavor even after storage is obtained.

According to the present invention, it provides a separated liquid seasoning containing an oil phase and an aqueous phase which is excellent in storability and quality stability and has a good taste and flavor while comprising a large amount of ω3 fatty acids.

The separated liquid seasoning of the present invention is a separated liquid seasoning which has an oil phase and an aqueous phase and in which they are present in a separated state.

(A) ω3 fatty acids derived from a fat or oil is blended in the separated liquid seasoning of the present invention. Examples of the ω3 fatty acids include α-linolenic acid (ALA, C18:3), eicosapentaenoic acid (EPA, C20:5), and docosahexaenoic acid (DHA, C22:6). The ω3 fatty acids may be used alone, or as a combination of two or more.

In the separated liquid seasoning of the present invention, the amount blended of (A) the ω3 fatty acids derived from the fat or oil are 3 to 20% by mass. The amount blended of (A) the ω3 fatty acids derived from the fat or oil depends on the type of ω3 fatty acids, and is more preferably 4% by mass (hereinafter described as "%") or more, more preferably 5% or more, more preferably 7% or more, and even more preferably 10% or more in terms of physiological effects and even more preferably 19% or less, more preferably 18% or less, more preferably 16% or less, and even more preferably 13% or less in terms of an adequate intake of lipids.

In the separated liquid seasoning, the amount blended of (A) the ω3 fatty acids derived from the fat or oil is more preferably from 4 to 19%, more preferably from 5 to 18%, more preferably from 7 to 16%, and even more preferably from 10 to 13%.

When the separated liquid seasoning contains (A1) eicosapentaenoic acid and docosahexaenoic acid derived from a fat or oil, the amount blended of (A) the ω3 fatty acids derived from the fat or oil, in the separated liquid seasoning, is preferably 10% or less, more preferably 8% or less, more preferably 6% or less, more preferably 5% or less, and even more preferably 4% or less in terms of suppressing a fishy odor, in terms of herbal odor suppression, and in terms of a lasting feeling of aftertaste and the reduction in a time for oil-water separation.

When the separated liquid seasoning contains (A1) eicosapentaenoic acid and docosahexaenoic acid derived from the fat or oil, the amount blended of (A) the ω3 fatty acids derived from the fat or oil, in the separated liquid seasoning, is preferably from 3 to 10%, more preferably from 3 to 8%, more preferably from 3 to 6%, more preferably from 3 to 5%, and even more preferably from 3 to 4%.

When the separated liquid seasoning does not contain (A1) eicosapentaenoic acid and docosahexaenoic acid derived from the fat or oil, the amount blended of (A) the ω3 fatty acids derived from the fat or oil, in the separated liquid seasoning, is preferably 11% or less and even more preferably 8% or less in terms of suppressing a deterioration odor derived from linseed (flaxseed) oil, and in terms of the reduction in a time for oil-water separation.

When the separated liquid seasoning does not contain (A1) eicosapentaenoic acid and docosahexaenoic acid derived from the fat or oil, the amount blended of (A) the ω3 fatty acids derived from the fat or oil, in the separated liquid seasoning, is preferably from 3 to 18%, more preferably from 3 to 13%, more preferably from 3 to 11%, more preferably from 4 to 11%, and even more preferably from 3 to 8%.

The amount blended in the separated liquid seasoning herein refers to the amount incorporated (added) in the separated liquid seasoning, which is the content based on the total amount of the separated liquid seasoning in which the oil phase and the aqueous phase are combined.

When the separated liquid seasoning contains (A1) eicosapentaenoic acid and docosahexaenoic acid derived from the fat or oil, and (A2) α-linolenic acid derived from a fat or oil, the total amount blended of (A1) eicosapentaenoic acid and docosahexaenoic acid derived from the fat or oil, in the separated liquid seasoning, is preferably 0.1% or more, more preferably 0.5% or more, more preferably 1% or more, more preferably 2% or more, and even more preferably 3% or more in terms of physiological effects and preferably 8% or less, more preferably 7.5% or less, more preferably 7% or less, more preferably 5% or less, more preferably 5% or less, more preferably 4% or less, more preferably 3% or less, more preferably 2% or less, and even more preferably 1.5% or less in terms of fishy odor suppression.

When the separated liquid seasoning contains (A1) eicosapentaenoic acid and docosahexaenoic acid derived from the fat or oil, and (A2) α-linolenic acid derived from the fat or oil, the total amount blended of (A1) eicosapentaenoic acid and docosahexaenoic acid derived from the fat or oil, in the separated liquid seasoning, is preferably from 0.1 to 8%, more preferably from 0.5 to 7.5%, more preferably from 0.5 to 7%, more preferably from 0.5 to 6% more preferably from 0.5 to 5%, more preferably from 0.5 to 4%, more preferably from 0.5 to 3%, more preferably from 0.5 to 2%, and even more preferably from 0.5 to 1.5%.

When the separated liquid seasoning contains (A1) eicosapentaenoic acid and docosahexaenoic acid derived from the fat or oil, and (A2) α-linolenic acid derived from the fat or oil, the amount blended of (A2) α-linolenic acid derived from the fat or oil, in the separated liquid seasoning, is preferably 0.1% or more, more preferably 0.5% or more, more preferably 1% or more, and even more preferably 2% or more in terms of physiological effects and preferably 8% or less, more preferably 6% or less, and even more preferably 4% or less in terms of fishy odor suppression and the suppression of a deterioration odor derived from linseed (flaxseed) oil.

When the separated liquid seasoning contains (A1) eicosapentaenoic acid and docosahexaenoic acid derived from the fat or oil, and (A2) α-linolenic acid derived from the fat or oil, the amount blended of (A2) α-linolenic acid derived from the fat or oil, in the separated liquid seasoning, is preferably from 0.1 to 8%, more preferably from 0.5 to 6%, more preferably from 1 to 4%, and even more preferably from 2 to 4%.

The amount blended of (A2) α-linolenic acid derived from the fat or oil, in the separated liquid seasoning not containing (A1) eicosapentaenoic acid and docosahexaenoic acid derived from the fat or oil, is preferably 0.1% or more, more preferably 0.5% or more, more preferably 1% or more, more preferably 3% or more, and even more preferably 7% or more in terms of physiological effects and preferably 20% or less, more preferably 19.5% or less, more preferably 19% or less, more preferably 17% or less, more preferably 13% or less, more preferably 11% or less, and even more preferably 8% or less.

The amount blended of (A2) α-linolenic acid derived from the fat or oil, in the separated liquid seasoning not containing (A1) eicosapentaenoic acid and docosahexaenoic acid derived from the fat or oil, is preferably from 0.1 to 20%, more preferably from 0.5 to 19.5%, more preferably from 1 to 19%, more preferably from 3 to 17%, more preferably from 3 to 13%, more preferably from 3 to 11%, and even more preferably from 3 to 8%.

Preferably, (A) the ω3 fatty acids derived from the fat or oil are blended in the separated liquid seasoning as a fatty acid constituting the fat or oil.

The amount blended of the fat or oil in the separated liquid seasoning is preferably 10% or more, more preferably 20% or more, and even more preferably 25% or more in view of seasoning and preferably 60% or less, more preferably 50% or less, and even more preferably 40% or less in terms of an adequate intake of lipids.

The amount of the fat or oil blended in the separated liquid seasoning is preferably from 10 to 60%, more preferably from 20 to 50%, and even more preferably from 25 to 40%.

Such a fat or oil is used as an oil phase component of the separated liquid seasoning.

The fatty acids constituting the fat or oil, other than the ω3 fatty acids, are not particularly limited and may be saturated fatty acids or unsaturated fatty acids. In terms of appearance, preferably 60% or more, more preferably 70% or more, more preferably 75% or more, and even more preferably 80% or more of the constituent fatty acids are unsaturated fatty acids, and in terms of the industrial productivity of the fat or oil, preferably 100% or less, more preferably 99% or less, and even more preferably 98% or less of the constituent fatty acids are unsaturated fatty acids. The content of the unsaturated fatty acids in the fatty acids constituting the fat or oil is preferably from 60 to 100%, more preferably from 70 to 100%, more preferably from 75 to 99%, and even more preferably from 80 to 98%. The number of carbon atoms of the unsaturated fatty acid is preferably from 14 to 24 and even more preferably from 16 to 22 in terms of physiological effects.

The content of saturated fatty acids in the fatty acids constituting the fat or oil is preferably 40% or less, more preferably 30% or less, more preferably 25% or less, and more preferably 20% or less in terms of appearance and physiological effects. The content of the saturated fatty acids in the fatty acids constituting the fat or oil is preferably 0.5% or more in terms of the industrial productivity of the fat or oil. As the saturated fatty acids, those having from 14 to 24 carbon atoms are preferred, and those having from 16 to 22 carbon atoms are further preferred.

The substances constituting the fat or oil in the present invention include not only triacylglycerol but also monoacylglycerol and diacylglycerol. In other words, in the present invention, the fat or oil comprises any one or more of monoacylglycerol, diacylglycerol, and triacylglycerol.

The content of triacylglycerol in the fat or oil is preferably from 78 to 100%, more preferably from 88 to 100%, more preferably from 90 to 99.5%, and even more preferably from 92 to 99% in terms of the industrial productivity of the fat or oil.

The content of diacylglycerol in the fat or oil is preferably 19% or less, and even more preferably 9% or less, more preferably from 0.1 to 7%, and even more preferably from 0.2 to 5% in terms of the industrial productivity of the fat or oil. The content of monoacylglycerol in the fat or oil is preferably 3% or less and even more preferably from 0 to 2% in terms of making the taste and flavor good.

The content of free fatty acids or salts thereof contained in the fat or oil is preferably 5% or less, and even more preferably from 0 to 2% and even more preferably from 0 to 1% in terms of taste and flavor and the industrial productivity of the fat or oil.

The fat or oil in the present invention is not particularly limited as long as it can be used as an edible fat or oil. Examples of the fat or oil in the present invention can include fats or oils such as vegetable fats or oils such as soybean oil, rapeseed oil, safflower oil, rice oil, corn oil, sunflower oil, cottonseed oil, olive oil, sesame oil, peanut oil, adlay oil, wheat germ oil, perilla oil, linseed (flaxseed) oil, sacha inchi oil, walnut oil, kiwi fruit seed oil, salvia seed oil, grape seed oil, macadamia nut oil, hazelnut oil, pumpkin seed oil, camellia oil, tea seed oil, borage oil, palm oil, palm olein, palm stearin, coconut oil, palm kernel oil, cacao butter, sal butter, shea butter, and algae oil; animal fats or oils such as fish oil, lard, beef tallow, and butterfat; or transesterified oils, hydrogenated oils, and fractionated oils thereof. The edible fats or oils are preferably refined fats or oils which have undergone a refining step.

These oils may each be used singly or may be appropriately mixed and used. Among them, a liquid fat or oil excellent in low temperature resistance is preferably used in terms of usability, and one or more selected from the group consisting of vegetable oils such as soybean oil, rapeseed oil, safflower oil, corn oil, sunflower oil, cottonseed oil, olive oil, sesame oil, peanut oil, adlay oil, wheat germ oil, perilla oil, and linseed (flaxseed) oil, algae oil, and fish oil are more preferably used.

Further, for the fat or oil, one or more selected from the group consisting of linseed (flaxseed) oil, perilla oil, and fish oil and one or more selected from the group consisting of soybean oil, rapeseed oil, safflower oil, corn oil, sunflower oil, cottonseed oil, olive oil, and sesame oil are preferably mixed and used.

The proportion of one or more fats or oils selected from the group consisting of linseed (flaxseed) oil, algae oil, and fish oil is preferably from 0.1 to 100% in the total amount of fats or oils.

The fish oil is an aquatic animal fat or oil and can be extracted from a raw material, for example, a sardine, a herring, a saury, a mackerel, a tuna, a squid, or a cod liver. The algae oil can be extracted from algae belonging to Chlorophyceae, Bacillariophyceae, or the like. The liquid fat or oil refers to a fat or oil which is liquid at 20° C. when subjected to the cooling test according to the JOCS Standard Methods for the Analysis of Fats, Oils and Related Materials, 2.3.8-27.

(B) rosmarinic acid blended in the separated liquid seasoning of the present invention is a compound of the chemical name (R)-2-[(E)-3-(3,4-dihydroxyphenyl)-1-oxo-2-propenyloxy]-3-(3,4-dihydroxyphenyl)propanoic acid represented by the molecular formula $C_{18}H_{16}O_8$ and is one of phenolic acids contained in labiates such as rosemary. For (B) rosmarinic acid blended in the separated liquid seasoning of the present invention, an extract extracted from rosemary or lemon balm by an extraction method is preferably used.

The amount of (B) rosmarinic acid blended in the separated liquid seasoning of the present invention is preferably 1 ppm (parts per million by mass) or more, more preferably 10 ppm or more, more preferably 50 ppm or more, and even more preferably 100 ppm or more in view of the suppression of flavor deterioration (a fishy odor, and a deterioration odor derived from linseed (flaxseed) oil) with the storage and preferably 400 ppm or less, more preferably 390 ppm or less, more preferably 350 ppm or less, more preferably 300 ppm or less, and even more preferably 250 ppm or less in terms of herb-like odor suppression. The amount of (B) rosmarinic acid blended in the separated liquid seasoning is preferably from 1 to 400 ppm, more preferably from 10 to 390 ppm, more preferably from 50 to 350 ppm, more preferably from 100 to 300 ppm, and even more preferably from 100 to 250 ppm.

When the separated liquid seasoning of the present invention contains eicosapentaenoic acid and docosahexaenoic acid as the (A) component, the amount of (B) rosmarinic acid blended is preferably 1 ppm (parts per million by mass) or more, more preferably 10 ppm or more, more preferably 50 ppm or more, and even more preferably 100 ppm or more in view of the suppression of flavor deterioration with the storage and preferably 400 ppm or less, more preferably 390 ppm or less, more preferably 350 ppm or less, more preferably 300 ppm or less, more preferably 250 ppm or less, more preferably 200 ppm or less, and even more preferably 150 ppm or less in terms of herb-like odor suppression.

The amount of (B) rosmarinic acid blended in the separated liquid seasoning containing eicosapentaenoic acid and docosahexaenoic acid as the (A) component is preferably from 1 to 400 ppm, more preferably from 10 to 390 ppm, more preferably from 50 to 350 ppm, more preferably from 50 to 250 ppm, more preferably from 50 to 200 ppm, more preferably from 50 to 150 ppm, and even more preferably from 100 to 150 ppm.

When the separated liquid seasoning of the present invention does not contain eicosapentaenoic acid and docosahexaenoic acid as the (A) component, the amount of (B) rosmarinic acid blended is preferably 1 ppm (parts per million by mass) or more, more preferably 10 ppm or more, more preferably 50 ppm or more, and even more preferably 100 ppm or more in view of the suppression of flavor deterioration with the storage and preferably 400 ppm or less, more preferably 300 ppm or less, more preferably 200 ppm or less, and even more preferably 150 ppm or less in terms of herb-like odor suppression.

The amount of (B) rosmarinic acid blended in the separated liquid seasoning not containing eicosapentaenoic acid and docosahexaenoic acid as the (A) component is preferably from 1 to 400 ppm, more preferably from 10 to 300 ppm, more preferably from 50 to 200 ppm, and even more preferably from 100 to 150 ppm.

Carnosic acid, carnosol, or a combination thereof may be further blended in the separated liquid seasoning of the present invention. Carnosic acid and carnosol are components contained in labiates such as rosemary and sage, like (B) rosmarinic acid, and extracts extracted from plants by extraction methods may be used. Carnosic acid and carnosol are preferably blended in the oil phase of the separated liquid seasoning.

The amount of carnosic acid, carnosol, or the combination thereof blended in the separated liquid seasoning of the present invention is preferably from 0.1 to 40 ppm and even more preferably from 10 to 30 ppm in view of deterioration suppression and in view of a herbal odor. As the method for analyzing carnosic acid and carnosol, high performance liquid chromatography (HPLC) can be used.

Glutathione is a tripeptide comprising glutamic acid, cysteine, and glycine (N—(N-L-γ-glutamyl-L-cysteinyl) glycine) and is known to be present as the reduced form (GSH) and the oxidized form (GSSG). (C) reduced glutathione (GSH) for blending in the separated liquid seasoning of the present invention can be obtained by a known production method, for example, any of a synthesis method, an enzymatic method, or an extraction method (see BIO INDUSTRY vol 27, No. 8 (2010)). As food applications, an extraction method is preferred. Examples of the extraction method include a method involving adding a slight amount of zinc to a Saccharomyces yeast (see JP-A-1-141591), and a method involving using a yeast having cadmium resistance or macrolide antibiotic resistance (JP-A-2006-42637 and JP-A-2006-42638). By these, yeast extracts highly containing glutathione are obtained. When oxidized glutathione (GSSG) is contained in the obtained yeast extract, it may be converted into reduced glutathione by a reduction reaction (JP-A-2007-254325, JP-A-2007-254324, and JP-A-2007-277109).

The amount of (C) reduced glutathione blended in the separated liquid seasoning of the present invention is preferably 0.1 ppm or more, more preferably 0.5 ppm or more, more preferably 1 ppm or more, more preferably 3 ppm or more, and even more preferably 5 ppm or more in view of the suppression of flavor deterioration with the storage and preferably 30 ppm or less, more preferably 20 ppm or less, more preferably 18 ppm or less, more preferably 15 ppm or less, and even more preferably 12 ppm or less in terms of a lasting feeling of aftertaste.

The amount of (C) reduced glutathione blended in the separated liquid seasoning is preferably from 0.1 to 30 ppm, more preferably from 0.5 to 20 ppm, more preferably from 1 to 18 ppm, more preferably from 3 to 15 ppm, and even more preferably from 5 to 12 ppm.

The analysis of the components (B) and (C) herein follows methods described in Examples below.

When eicosapentaenoic acid and docosahexaenoic acid are contained as the (A) component in the separated liquid seasoning of the present invention, the mass ratio of the total amount of (B) rosmarinic acid and (C) reduced glutathione blended in the separated liquid seasoning to the amount blended of (A) the ω3 fatty acids derived from the fat or oil, in the separated liquid seasoning, $[\{(B)+(C)\}/(A)]$, depends on the type of ω3 fatty acids, and is preferably $1\times10^{-4}$ or more, more preferably $5\times10^{-4}$ or more, more preferably $15\times10^{-4}$ or more, and even more preferably $25\times10^{-4}$ or more in view of the suppression of flavor deterioration with the storage and preferably $100\times10^{-4}$ or less, more preferably $70\times10^{-4}$ or less, more preferably $50\times10^{-4}$ or less, and even more preferably $35\times10^{-4}$ or less in terms of (B) a herb-like odor and a lasting feeling of aftertaste.

Such a mass ratio, $[\{(B)+(C)\}/(A)]$, is preferably in the range of from $1\times10^{-4}$ to $100\times10^{-4}$, more preferably in the range of from $5\times10^{-4}$ to $70\times10^{-4}$, more preferably in the range of from $15\times10^{-4}$ to $50\times10^{-4}$, and even more preferably in the range of from $25\times10^{-4}$ to $35\times10^{-4}$.

The mass ratio of the total amount of (B) rosmarinic acid and (C) reduced glutathione blended in the separated liquid seasoning to the total amount blended of (A1) eicosapentaenoic acid and docosahexaenoic acid derived from the fat or oil, in the separated liquid seasoning, $[\{(B)+(C)\}/(A1)]$, is preferably $5\times10^{-4}$ or more, more preferably $15\times10^{-4}$ or more, more preferably $70\times10^{-4}$ or more, and even more preferably $85\times10^{-4}$ or more and preferably $300\times10^{-4}$ or less, more preferably $200\times10^{-4}$ or less, more preferably $150\times10^{-4}$ or less, and even more preferably $100\times10^{-4}$ or less from the same point of view as mentioned above.

Such a mass ratio, $[\{(B)+(C)\}/(A1)]$, is preferably in the range of from $5\times10^{-4}$ to $300\times10^{-4}$, more preferably in the range of from $15\times10^{-4}$ to $200\times10-4$, more preferably in the range of from $70\times10^{-4}$ to $150\times10^{-4}$, and even more preferably in the range of from $85\times10^{-4}$ to $100\times10^{-4}$.

When eicosapentaenoic acid and docosahexaenoic acid are contained as the (A) component in the separated liquid seasoning, the mass ratio of the total amount of (B) rosmarinic acid and (C) reduced glutathione blended in the separated liquid seasoning to the amount blended of (A2) α-linolenic acid derived from the fat or oil, in the separated liquid seasoning, $[\{(B)+(C)\}/(A2)]$, is preferably $3\times10^{-4}$ or more, more preferably $7\times10^{-4}$ or more, more preferably $15\times10^{-4}$ or more, and even more preferably $30\times10^{-4}$ or more and preferably $300\times10^{-4}$ or less, more preferably $250\times10^{-4}$ or less, more preferably $100\times10^{-4}$ or less, more preferably $60\times10^{-4}$ or less, and even more preferably $45\times10^{-4}$ or less from the same point of view as mentioned above.

Such a mass ratio, $[\{(B)+(C)\}/(A2)]$, is preferably in the range of from $3\times10^{-4}$ to $300\times10^{-4}$, more preferably in the range of from $7\times10^{-4}$ to $250\times10^{-4}$, more preferably in the range of from $15\times10^{-4}$ to $100\times10^{-4}$, more preferably in the range of from $30\times10^{-4}$ to $60\times10^{-4}$, and even more preferably in the range of from $30\times10^{-4}$ to $45\times10^{-4}$.

When eicosapentaenoic acid and docosahexaenoic acid are not contained as the (A) component in the separated liquid seasoning of the present invention, the mass ratio of the total amount of (B) rosmarinic acid and (C) reduced glutathione blended in the separated liquid seasoning to the amount of blended (A) the ω3 fatty acids derived from the fat or oil, in the separated liquid seasoning, $[\{(B)+(C)\}/(A)]$, depends on the type of ω3 fatty acids, and is preferably $1\times10^{-4}$ or more, more preferably $5\times10^{-4}$ or more, more preferably $7\times10^{-4}$ or more, and even more preferably $9\times10^{-4}$ or more in view of the suppression of flavor deterioration with the storage and preferably $50\times10^{-4}$ or less, more preferably $35\times10^{-4}$ or less, more preferably $30\times10^{-4}$ or less, and even more preferably $25\times10^{-4}$ or less in terms of a herb-like odor and a lasting feeling of aftertaste.

Such a mass ratio, $[\{(B)+(C)\}/(A)]$, is preferably in the range of from $1\times10^{-4}$ to $50\times10^{-4}$, more preferably in the range of from $5\times10^{-4}$ to $35\times10^{-4}$, more preferably in the range of from $7\times10^{-4}$ to $30\times10^{-4}$, and even more preferably in the range of from $9\times10^{-4}$ to $25\times10^{-4}$.

When eicosapentaenoic acid and docosahexaenoic acid are not contained as the (A) component in the separated liquid seasoning of the present invention, the mass ratio of the total amount of (B) rosmarinic acid and (C) reduced glutathione blended in the separated liquid seasoning to the amount blended of (A2) α-linolenic acid derived from the fat or oil, in the separated liquid seasoning, $[\{(B)+(C)\}/$ (A2)], is preferably $1\times10^{-4}$ or more, more preferably $5\times10^{-4}$ or more, more preferably $7\times10^{-4}$ or more, more preferably $9\times10^{-4}$ or more, more preferably $12\times10^{-4}$ or more, more preferably $20\times10^{-4}$ or more and preferably $50\times10^{-4}$ or less, more preferably $35\times10^{-4}$ or less, more preferably $30\times10^{-4}$ or less, and even more preferably $25\times10^{-4}$ or less from the same point of view as mentioned above.

Such a mass ratio, $[\{(B)+(C)\}/(A2)]$, is preferably in the range of from $1\times10^{-4}$ to $50\times10^{-4}$, more preferably in the range of from $5\times10^{-4}$ to $35\times10^{-4}$, more preferably in the range of from $7\times10^{-4}$ to $30\times10^{-4}$, more preferably in the range of from $9\times10^{-4}$ to $30\times10^{-4}$, more preferably in the range of from $12\times10^{-4}$ to $30\times10^{-4}$, and even more preferably in the range of from $20\times10^{-4}$ to $25\times10^{-4}$.

(D) a phospholipid may be blended in the separated liquid seasoning of the present invention. Meanwhile, the amount of (D) the phospholipid blended in the separated liquid seasoning is 40 ppm or less. When a large amount of (D) the phospholipid is blended in the separated liquid seasoning, deterioration is likely to proceed over time. When the blending proportion is 40 ppm or less, the flavor deterioration of the separated liquid seasoning with storage can be suppressed, and it is easy to prevent the emulsification of the oil phase and the aqueous phase after the use (shaking) of the separated liquid seasoning to thereby maintain the separated state.

The amount of (D) the phospholipid blended in the separated liquid seasoning is more preferably 20 ppm or less and even more preferably 15 ppm or less in view of maintaining the separated state after shaking and preferably 2 ppm or more and even more preferably 5 ppm or more in view of the suppression of flavor deterioration with the storage. The amount of (D) the phospholipid blended in the separated liquid seasoning is from 0 to 40 ppm and even more preferably from 0 to 20 ppm, more preferably from 2 to 20 ppm, more preferably from 2 to 15 ppm, and even more preferably from 5 to 15 ppm.

(D) the phospholipid may be a natural product extracted from an animal or plant and refined, or a chemically synthesized product, or may be a product subjected to processing such as hydrogenation or hydroxylation treatment. As the natural product, lecithin which is an extracted and refined product from soybeans, egg yolk, or the like is preferred in terms of the easy availability of commercial products. Examples of the lecithin include soybean lecithin, egg yolk lecithin, soybean lecithin hydrogenated products, and egg yolk lecithin hydrogenated products.

Examples of the component of (D) the phospholipid include glycerophospholipids such as phosphatidylcholine, phosphatidic acid, phosphatidylserine, phosphatidylethanolamine, and phosphatidylinositol; and sphingophospholipids such as sphingomyelin and ceramide ciliatine.

An emulsifier other than the phospholipid is preferably not blended in the separated liquid seasoning of the present invention. Examples of the emulsifier other than the phospholipid include polyglycerin fatty acid esters, organic acid monoglycerides, and sucrose fatty acid esters. The amount blended of the emulsifier other than the phospholipid in the separated liquid seasoning is preferably 30 ppm or less and even more preferably substantially 0%. Here, substantially 0% refers to a case where an emulsifier other than the phospholipid is irreversibly blended from another component used in the separated liquid seasoning.

Examples of the separated liquid seasoning of the present invention include semisolid dressings and separated liquid dressings defined by the Japanese Agricultural Standards (JAS). But examples of the separated liquid seasoning of the present invention are not particularly limited thereto, and also include those widely referred to as mayonnaise, mayonnaise-like foods, dressings, and dressing-like foods.

The blending ratio (mass ratio) between the oil phase and the aqueous phase in the separated liquid seasoning of the present invention is preferably oil phase/aqueous phase=10/90 to 80/20, more preferably from 20/80 to 80/20, more preferably from 20/80 to 70/30, and even more preferably from 30/70 to 70/30.

The aqueous phase of the separated liquid seasoning of the present invention is not particularly limited, and can contain water; vinegars such as rice vinegar, sake lees vinegar, cider vinegar, grape vinegar, grain vinegar, and synthetic vinegar; salts such as common salt; seasonings such as sodium glutamate; saccharides such as sugar and starch syrup; taste materials such as sake and sweet sake; various vitamins; organic acids such as citric acid, and salts thereof; spices; squeezed juices of various vegetables or fruits such as lemon fruit juice; various vegetables; various fruits; polysaccharide thickeners such as xanthan gum, gellan gum, guar gum, tamarind gum, carrageenan, pectin, and tragacanth gum; starches such as potato starch, decomposition products thereof, and starches obtained by subjecting them to chemical modification treatment; dairy products such as milk; proteins such as soybean protein, milk protein, and wheat protein, or isolates and decomposition products of these proteins; various phosphates; and the like.

In the present invention, these can be appropriately blended according to the viscosity and physical properties of the target composition, and the like.

The pH (20° C.) of the aqueous phase of the separated liquid seasoning of the present invention is preferably pH 5.5 or less in terms of storability and even more preferably in the range of from pH 2.5 to 5.5, more preferably in the range of from pH 3 to 5, and even more preferably in the range of from pH 3.2 to 4.5. In order to decrease the pH within this range, acidulants such as vinegars, organic acids such as citric acid, malic acid, and gluconic acid, inorganic acids such as phosphoric acid, and lemon fruit juice can be used, but the vinegars above mentioned are preferably used in terms of making storability better and in terms of maintaining the taste and flavor of the material immediately after separated liquid seasoning production.

In the separated liquid seasoning of the present invention, it is preferred that the "time for oil-water separation after shaking" measured by the method described in Examples is within 15 minutes and preferably 4 to 10 minutes in view of maintaining the separated state after shaking.

The separated liquid seasoning of the present invention can be produced by blending (A) the ω3 fatty acids derived from the fat or oil, (B) rosmarinic acid, and (C) reduced glutathione, and (D) the phospholipid as needed. Preferably, it is preferred to use, as an oil phase, a fat or oil comprising ω3 fatty acids as a constituent fatty acid, and produce the separated liquid seasoning by bringing into contact with each other the oil phase and an aqueous phase in which (B) rosmarinic acid and (C) reduced glutathione are blended. When (D) the phospholipid is blended, it may be added to either the oil phase or the aqueous phase but is preferably added to the oil phase. The oil phase and the aqueous phase are each preferably filled into a container.

The separated liquid seasoning produced in this manner is filled into a container and can be used like usual dressings and the like as a food in a container. For example, it can be used for sauces such as tartar sauce, sandwiches, and salads, as well as cooking such as grilled dishes, stir-fried dishes, and dressed dishes.

Regarding the above-described embodiments, the present invention further discloses the following separated liquid seasoning or use.

<1> A separated liquid seasoning comprising the following components (A), (B), and (C) blended therein:
(A) ω3 fatty acids derived from a fat or oil, in an amount of from 3 to 20% by mass;
(B) rosmarinic acid; and
(C) reduced glutathione,
wherein (D) a phospholipid is blended in an amount of 40 ppm or less in the separated liquid seasoning.

<2> The separated liquid seasoning according to <1>, wherein (A) the ω3 fatty acids derived from the fat or oil are preferably one or a combination of two or more selected from the group consisting of α-linolenic acid, eicosapentaenoic acid, and docosahexaenoic acid.

<3> The separated liquid seasoning according to <1> or <2>, wherein an amount blended of (A) the ω3 fatty acids derived from the fat or oil is preferably 4% by mass or more, more preferably 5% by mass or more, more preferably 7% by mass or more, and even more preferably 10% by mass or more, and preferably 19% by mass or less, more preferably 18% by mass or less, more preferably 16% by mass or less, and even more preferably 13% by mass or less, and preferably from 4 to 19% by mass, more preferably from 5 to 18% by mass, more preferably from 7 to 16% by mass, and even more preferably from 10 to 13% by mass.

<4> The separated liquid seasoning according to any one of <1> to <3>, wherein a total amount blended of (A1) eicosapentaenoic acid and docosahexaenoic acid derived from a fat or oil is preferably 0.1% by mass or more, more preferably 0.5% by mass or more, more preferably 1% by mass or more, more preferably 2% by mass or more, and even more preferably 3% by mass or more, and preferably 8% by mass or less, more preferably 7.5% by mass or less, more preferably 7% by mass or less, more preferably 6% by mass or less, and even more preferably 5% by mass or less, and preferably from 0.1 to 8% by mass, more preferably from 0.5 to 7.5% by mass, more preferably from 1 to 7% by mass, more preferably from 2 to 6% by mass, and even more preferably from 3 to 5% by mass.

<5> The separated liquid seasoning according to any one of <1> to <4>, wherein an amount blended of (A2) α-linolenic acid derived from a fat or oil is preferably 0.1% by mass or more, more preferably 0.5% by mass or more, more preferably 1% by mass or more, more preferably 3% by mass or more, and even more preferably 7% by mass or more, and preferably 20% by mass or less, more preferably 19.5% by mass or less, more preferably 19% by mass or less, more preferably 17% by mass or less, and even more preferably 13% by mass or less, and preferably from 0.1 to 20% by mass, more preferably from 0.5 to 19.5% by mass, more preferably from 1 to 19% by mass, more preferably from 3 to 17% by mass, and even more preferably from 7 to 13% by mass.

<6> The separated liquid seasoning according to <1> or <2>, wherein, when the separated liquid seasoning contains (A1) eicosapentaenoic acid and docosahexaenoic acid derived from a fat or oil, an amount blended of (A) the ω3 fatty acids derived from the fat or oil, in the separated liquid seasoning, are preferably 10% by mass or less, more preferably 8% by mass or less, more preferably 6% by mass or less, more preferably 5% by mass or less, and even more preferably 4% by mass or less and preferably from 3 to 10% by mass, more preferably from 3 to 8% by mass, more preferably from 3 to 6% by mass, more preferably from 3 to 5% by mass, and even more preferably from 3 to 4% by mass.

<7> The separated liquid seasoning according to <1> or <2>, wherein, when the separated liquid seasoning does not contain (A1) eicosapentaenoic acid and docosahexaenoic acid derived from a fat or oil, an amount blended of (A) the ω3 fatty acids derived from the fat or oil, in the separated liquid seasoning, is preferably 11% by mass or less and more preferably 8% by mass or less and preferably from 3 to 18% by mass, more preferably from 3 to 13% by mass, more preferably from 3 to 11% by mass, and even more preferably from 3 to 8% by mass.

<8> The separated liquid seasoning according to any one of <1> to <3> and <6>, wherein, when the separated liquid seasoning contains (A1) eicosapentaenoic acid and docosahexaenoic acid derived from the fat or oil, and (A2) α-linolenic acid derived from a fat or oil, a total amount blended of (A1) eicosapentaenoic acid and docosahexaenoic acid derived from the fat or oil, in the separated liquid seasoning is preferably 0.1% by mass or more, more preferably 0.5% by mass or more, more preferably 1% by mass or more, more preferably 2% by mass or more, and even more preferably 3% by mass or more, and preferably 8% by mass or less, more preferably 7.5% by mass or less, more preferably 7% by mass or less, more preferably 6% by mass or less, more preferably 5% by mass or less, more preferably 4% by mass or less, more preferably 3% by mass or less, more preferably 2% by mass or less, and even more preferably 1.5% by mass or less, and preferably from 0.1 to 8% by mass, more preferably from 0.5 to 7.5% by mass, more preferably from 0.5 to 7% by mass, more preferably from 0.5 to 6% by mass, more preferably from 0.5 to 5% by mass, more preferably from 0.5 to 4% by mass, more preferably from 0.5 to 3% by mass, more preferably from 0.5 to 2% by mass, and even more preferably from 0.5 to 1.5% by mass.

<9> The separated liquid seasoning according to any one of <1> to <3>, <6>, and <8>, wherein, when the separated liquid seasoning contains (A1) eicosapentaenoic acid and docosahexaenoic acid derived from the fat or oil, and (A2) α-linolenic acid derived from the fat or oil, an amount blended of (A2) α-linolenic acid derived from the fat or oil, in the separated liquid seasoning, is preferably 0.1% by mass or more, more preferably 0.5% by mass or more, more preferably 1% by mass or more, and even more preferably 2% by mass or more, and preferably 8% by mass or less, more preferably 6% by mass or less, and even more preferably 4% by mass or less, and preferably from 0.1 to 8% by mass, more preferably from 0.5 to 6% by mass, more preferably from 1 to 4% by mass, and even more preferably from 2 to 4% by mass.

<10> The separated liquid seasoning according to any one of <1> to <3> and <7>, wherein, when the separated liquid seasoning does not contain (A1) eicosapentaenoic acid and docosahexaenoic acid derived from the fat or oil, an amount blended of (A2) α-linolenic acid derived from a fat or oil, in the separated liquid seasoning is preferably 0.1% by mass or more, more preferably 0.5% by mass or more, more preferably 1% by mass or more, more preferably 3% by mass or more, and even more preferably 7% by mass or more, and preferably 20% by mass or less, more preferably 19.5% by mass or less, more preferably 19% by mass or less, more preferably 17% by mass or less, more preferably 13% by mass or less, more preferably 11% by mass or less, and even more preferably 8% by mass or less, and preferably from 0.1 to 20% by mass, more preferably from 0.5 to 19.5% by mass, more preferably from 1 to 19% by mass, more preferably from 3 to 17% by mass, more preferably from 3 to 13% by mass, more preferably from 3 to 11% by mass, and even more preferably from 3 to 8% by mass.

<11> The separated liquid seasoning according to any one of <1> to <10>, wherein an amount of the fat or oil blended is preferably 10% by mass or more, more preferably 20% by mass or more, and even more preferably 25% by mass or more, and preferably 60% by mass or less, more preferably 50% by mass or less, and even more preferably 40% by mass or less, and preferably from 10 to 60% by mass, more preferably from 20 to 50% by mass, and even more preferably from 25 to 40% by mass.

<12> The separated liquid seasoning according to any one of <1> to <11>, wherein preferably 60% by mass or more, more preferably 70% by mass or more, more preferably 75% by mass or more, and even more preferably 80% by mass or more of fatty acids constituting the fat or oil are unsaturated fatty acids, and preferably 100% by mass or less, more preferably 99% by mass or less, and even more preferably 98% by mass or less of the fatty acids constituting the fat or oil are unsaturated fatty acids, and preferably from 60 to 100% by mass, more preferably from 70 to 100% by mass, more preferably from 75 to 99% by mass, and even more preferably from 80 to 98% by mass of the fatty acids constituting the fat or oil are unsaturated fatty acids.

<13> The separated liquid seasoning according to any one of <1> to <12>, wherein a content of saturated fatty acids in the fatty acids constituting the fat or oil is preferably 40% by mass or less, more preferably 30% by mass or less, more preferably 25% by mass or less, and even more preferably 20% by mass or less and preferably 0.5% by mass or more.

<14> The separated liquid seasoning according to any one of <1> to <13>, wherein a content of triacylglycerol in the fat or oil is preferably from 78 to 100% by mass, more preferably from 88 to 100% by mass, more preferably from 90 to 99.5% by mass, and even more preferably from 92 to 99% by mass.

<15> The separated liquid seasoning according to any one of <1> to <14>, wherein the fat or oil is preferably one or more selected from the group consisting of vegetable oils such as soybean oil, rapeseed oil, safflower oil, corn oil, sunflower oil, cottonseed oil, olive oil, sesame oil, peanut oil, adlay oil, wheat germ oil, perilla oil, linseed (flaxseed) oil, algae oil, and fish oil and more preferably a mixed oil of one or more selected from the group consisting of linseed (flaxseed) oil, algae oil, and fish oil and one or more selected from the group consisting of soybean oil, rapeseed oil, safflower oil, corn oil, sunflower oil, cottonseed oil, olive oil, and sesame oil.

<16> The separated liquid seasoning according to any one of <1> to <15>, wherein an amount of (B) rosmarinic acid blended is preferably 1 ppm (parts per million by mass) or more, more preferably 10 ppm or more, more preferably 50 ppm or more, and even more preferably 100 ppm or more, and preferably 400 ppm or less, more preferably 390 ppm or less, more preferably 350 ppm or less, more preferably 300 ppm or less, and even more preferably 250 ppm or less, and preferably from 1 to 400 ppm, more preferably from 10 to 390 ppm, more preferably from 50 to 350 ppm, more preferably from 100 to 300 ppm, and even more preferably from 100 to 250 ppm.

<17> The separated liquid seasoning according to any one of <1> to <6>, <8>, <9>, and <11> to <15>, wherein when the separated liquid seasoning contains eicosapentaenoic acid and docosahexaenoic acid as the (A) component, an amount of (B) rosmarinic acid blended is preferably 1 ppm (parts per million by mass) or more, more preferably 10 ppm or more, more preferably 50 ppm or more, and even more preferably 100 ppm or more, and preferably 400 ppm or less, more preferably 390 ppm or less, more preferably 350 ppm or less, more preferably 300 ppm or less, more preferably 250 ppm or less, more preferably 200 ppm or less, and even more preferably 150 ppm or less, and preferably from 1 to 400 ppm, more preferably from 10 to 390 ppm, more preferably from 50 to 350 ppm, more preferably from 50 to 250 ppm, more preferably from 50 to 200 ppm, more preferably from 50 to 150 ppm, and even more preferably from 100 to 150 ppm.

<18> The separated liquid seasoning according to any one of <1> to <3>, <7>, and <10> to <15>, wherein when the separated liquid seasoning does not contain eicosapentaenoic acid and docosahexaenoic acid as the (A) component, an amount of (B) rosmarinic acid blended is preferably 1 ppm (parts per million by mass) or more, more preferably 10 ppm or more, more preferably 50 ppm or more, and even more preferably 100 ppm or more, and preferably 400 ppm or less, more preferably 300 ppm or less, more preferably 200 ppm or less, and even more preferably 150 ppm or less, and preferably from 1 to 400 ppm, more preferably from 10 to 300 ppm, more preferably from 50 to 200 ppm, and even more preferably from 100 to 150 ppm.

<19> The separated liquid seasoning according to any one of <1> to <18>, by further comprising carnosic acid, carnosol, or a combination thereof.

<20> The separated liquid seasoning according to <19>, wherein an amount of carnosic acid, carnosol, or the combination thereof blended is preferably from 0.1 to 40 ppm and more preferably from 10 to 30 ppm.

<21> The separated liquid seasoning according to any one of <1> to <20>, wherein an amount of (C) reduced glutathione blended is preferably 0.1 ppm (parts per million by mass) or more, more preferably 0.5 ppm or more, more preferably 1 ppm or more, more preferably 3 ppm or more, and even more preferably 5 ppm or more, and preferably 30 ppm or less, more preferably 20 ppm or less, more preferably 18 ppm or less, more preferably 15 ppm or less, and even more preferably 12 ppm or less, and preferably from 0.1 to 30 ppm, more preferably from 0.5 to 20 ppm, more preferably from 1 to 18 ppm, more preferably from 3 to 15 ppm, and even more preferably from 5 to 12 ppm.

<22> The separated liquid seasoning according to any one of <1> to <6>, <8>, <9>, <11> to <15>, <17>, and <19> to <21>, wherein when the separated liquid seasoning contains eicosapentaenoic acid and docosahexaenoic acid as the (A) component, a mass ratio of a total amount blended of (B) rosmarinic acid and (C) reduced glutathione in the separated liquid seasoning to the amount blended of (A) the ω3 fatty acids derived from the fat or oil, in the separated liquid seasoning, $[\{(B)+(C)\}/(A)]$, is preferably $1\times10^{-4}$ or more, more preferably $5\times10^{-4}$ or more, more preferably $15\times10^{-4}$ or more, and even more preferably $25\times10^{-4}$ or more, and preferably $100\times10^{-4}$ or less, more preferably $70\times10^{-4}$ or less, more preferably $50\times10^{-4}$ or less, and even more preferably $35\times10^{-4}$ or less, and preferably in a range of from $1\times10^{-4}$ to $100\times10^{-4}$, more preferably in a range of from $5\times10^{-4}$ to $70\times10^{-4}$, more preferably in a range of from $15\times10^{-4}$ to $50\times10^{-4}$, and even more preferably in a range of from $25\times10^{-4}$ to $35\times10^{-4}$.

<23> The separated liquid seasoning according to any one of <1> to <6>, <8>, <9>, <11> to <15>, <17>, and <19> to <22>, wherein a mass ratio of the total amount blended of (B) rosmarinic acid and (C) reduced glutathione in the separated liquid seasoning to the total amount blended of (A1) eicosapentaenoic acid and docosahexaenoic acid derived from the fat or oil, in the separated liquid seasoning, [{(B)+(C)}/(A1)], is preferably $5 \times 10^{-4}$ or more, more preferably $15 \times 10^{-4}$ or more, more preferably $70 \times 10^{-4}$ or more, and even more preferably $85 \times 10^{-4}$ or more, and preferably $300 \times 10^{-4}$ or less, more preferably $200 \times 10^{-4}$ or less, more preferably $150 \times 10^{-4}$ or less, and even more preferably $100 \times 10^{-4}$ or less, and preferably in a range of from $5 \times 10^{-4}$ to $300 \times 10^{-4}$, more preferably in a range of from $15 \times 10^{-4}$ to $200 \times 10^{-4}$, more preferably in a range of from $70 \times 10^{-4}$ to $150 \times 10^{-4}$, and even more preferably in a range of from $85 \times 10^{-4}$ to $100 \times 10^{-4}$.

<24> The separated liquid seasoning according to any one of <1> to <6>, <8>, <9>, <11> to <15>, <17>, and <19> to <23>, wherein when the separated liquid seasoning contains eicosapentaenoic acid and docosahexaenoic acid as the (A) component, a mass ratio of the total amount blended of (B) rosmarinic acid and (C) reduced glutathione in the separated liquid seasoning to the amount blended of (A2) α-linolenic acid derived from the fat or oil, in the separated liquid seasoning, [{(B)+(C)}/(A2)], is preferably $3 \times 10^{-4}$ or more, more preferably $7 \times 10^{-4}$ or more, more preferably $15 \times 10^{-4}$ or more, and even more preferably $30 \times 10^{-4}$ or more, and preferably $300 \times 10^{-4}$ or less, more preferably $250 \times 10^{-4}$ or less, more preferably $100 \times 10^{-4}$ or less, more preferably $60 \times 10^{-4}$ or less, and even more preferably $45 \times 10^{-4}$ or less, and preferably in a range of from $3 \times 10^{-4}$ to $300 \times 10^{-4}$, more preferably in a range of from $7 \times 10^{-4}$ to $250 \times 10^{-4}$, more preferably in a range of from $15 \times 10^{-4}$ to $100 \times 10^{-4}$, more preferably in a range of from $30 \times 10^{-4}$ to $60 \times 10^{-4}$, and even more preferably in a range of from $30 \times 10^{-4}$ to $45 \times 10^{-4}$.

<25> The separated liquid seasoning according to any one of <1> to <3>, <7>, <10> to <15>, and <18> to <21>, wherein when the separated liquid seasoning does not contain eicosapentaenoic acid and docosahexaenoic acid as the (A) component, a mass ratio of the total amount blended of (B) rosmarinic acid and (C) reduced glutathione in the separated liquid seasoning to the amount blended of (A) the ω3 fatty acids derived from the fat or oil, in the separated liquid seasoning, [{(B)+(C)}/(A)], is preferably $0.1 \times 10^{-4}$ or more, more preferably $0.3 \times 10^{-4}$ or more, more preferably $0.5 \times 10^{-4}$ or more, more preferably $0.7 \times 10^{-4}$ or more, more preferably $1 \times 10^{-4}$ or more, more preferably $5 \times 10^{-4}$ or more, more preferably $7 \times 10^{-4}$ or more, and even more preferably $9 \times 10^{-4}$ or more, and preferably $50 \times 10^{-4}$ or less, more preferably $35 \times 10^{-4}$ or less, more preferably $30 \times 10^{-4}$ or less, and even more preferably $25 \times 10^{-4}$ or less, and preferably in a range of from $1 \times 10^{-4}$ to $50 \times 10^{-4}$, more preferably in a range of from $5 \times 10^{-4}$ to $35 \times 10^{-4}$, more preferably in a range of from $7 \times 10^{-4}$ to $30 \times 10^{-4}$, and even more preferably in a range of from $9 \times 10^{-4}$ to $25 \times 10^{-4}$.

<26> The separated liquid seasoning according to any one of <1> to <3>, <7>, <10> to <15>, <18> to <21>, and <25>, wherein when the separated liquid seasoning does not contain eicosapentaenoic acid and docosahexaenoic acid as the (A) component, a mass ratio of the total amount blended of (B) rosmarinic acid and (C) reduced glutathione in the separated liquid seasoning to the amount blended of (A2) α-linolenic acid derived from the fat or oil, in the separated liquid seasoning, [{(B)+(C)}/(A2)], is preferably $0.1 \times 10^{-4}$ or more, more preferably $0.3 \times 10^{-4}$ or more, more preferably $0.5 \times 10^{-4}$ or more, more preferably $0.7 \times 10^{-4}$ or more, more preferably $1 \times 10^{-4}$ or more, more preferably $5 \times 10^{-4}$ or more, more preferably $7 \times 10^{-4}$ or more, more preferably $9 \times 10^{-4}$ or more, more preferably $12 \times 10^{-4}$ or more, and even more preferably $20 \times 10^{-4}$ or more, and preferably $50 \times 10^{-4}$ or less, more preferably $35 \times 10^{-4}$ or less, more preferably $30 \times 10^{-4}$ or less, and even more preferably $25 \times 10^{-4}$ or less, and preferably in a range of from $1 \times 10^{-4}$ to $50 \times 10^{-4}$, more preferably in a range of from $5 \times 10^{-4}$ to $35 \times 10^{-4}$, more preferably in a range of from $7 \times 10^{-4}$ to $30 \times 10^{-4}$, more preferably in a range of from $9 \times 10^{-4}$ to $30 \times 10^{-4}$, more preferably in a range of from $12 \times 10^{-4}$ to $30 \times 10^{-4}$, and even more preferably in a range of from $20 \times 10^{-4}$ to $25 \times 10^{-4}$.

<27> The separated liquid seasoning according to any one of <1> to <26>, wherein an emulsifier other than the phospholipid is not blended.

<28> The separated liquid seasoning according to any one of <1> to <27>, wherein an amount blended of the emulsifier other than the phospholipid in the separated liquid seasoning is preferably 30 ppm or less and more preferably substantially 0% by mass.

<29> The separated liquid seasoning according to any one of <1> to <28>, wherein the amount of (D) the phospholipid blended is preferably 20 ppm or less and more preferably 15 ppm or less, and preferably 2 ppm or more and more preferably 5 ppm or more, and preferably from 0 to 40 ppm, more preferably from 0 to 20 ppm, more preferably from 2 to 20 ppm, more preferably from 2 to 15 ppm, and even more preferably from 5 to 15 ppm.

<30> The separated liquid seasoning according to any one of <1> to <29>, wherein a blending ratio (mass ratio) between the oil phase and an aqueous phase in the separated liquid seasoning is preferably oil phase/aqueous phase=10/90 to 80/20, more preferably oil phase/aqueous phase=20/80 to 80/20, more preferably oil phase/aqueous phase=20/80 to 70/30, and even more preferably oil phase/aqueous phase=30/70 to 70/30.

<31> The separated liquid seasoning according to any one of <1> to <30>, wherein the "time for oil-water separation after shaking" of the separated liquid seasoning measured by a method described in Examples herein is preferably within 15 minutes and more preferably 4 to 10 minutes.

<32> A method for producing a separated liquid seasoning, comprising a step of blending (A) ω3 fatty acids derived from a fat or oil, (B) rosmarinic acid, and (C) reduced glutathione, and (D) phospholipid as needed, wherein an amount of the component (A) blended is 3 to 20% by mass based on a total mass of all raw materials blended, and an amount of the component (D) blended is 40 ppm or less based on the total mass of all the raw materials blended.

EXAMPLES

[Analysis Methods]
(1) Glyceride Composition of Oil or Fat

About 10 mg of a fat or oil sample and 0.5 mL of a trimethylsilylating agent ("silylating agent TH", manufactured by KANTO CHEMICAL CO., INC.) were put in a sample glass bottle, hermetically sealed, and heated at 70° C. for 15 minutes. 1.0 mL of water and 1.5 mL of hexane were added thereto, and the mixture was shaken. After allowing to stand, the upper layer was subjected to gas chromatography (GLC) and analyzed.

<GLC Analysis Conditions>
(Conditions)

Apparatus: Agilent 6890 Series (manufactured by Agilent Technologies)

Integrator: ChemStation B 02.01 SR2 (manufactured by Agilent Technologies)

Column: DB-1ht (manufactured by Agilent J&W)

Carrier gas: 1.0 mL He/min

Injector: Split (1:50), T=320° C.

Detector: FID, T=350° C.

Oven temperature: the temperature was increased from 80° C. to 340° C. at 10° C./min and maintained for 15 minutes (2) Constituent Fatty Acid Composition of Oil or Fat A fatty acid methyl ester was prepared in accordance with "Preparation of Methyl Ester of Fatty Acids (2.4.1.-1996)" in "the JOCS Standard Methods for the Analysis of Fats, Oils and Related Materials" edited by the Japan Oil Chemists' Society, and the obtained fat or oil sample was measured by American Oil Chemists. Society Official Method Ce 1f-96 (GLC method).
GLC Analysis Conditions>
Column: CP-SIL88 100 m×0.25 mm×0.2 μm (VARIAN)
Carrier gas: 1.0 mL He/min
Injector: Split (1:200), T=250° C.
Detector: FID, T=250° C.
Oven temperature: the temperature was maintained at 174° C. for 50 minutes, then increased to 220° C. at 5° C./min, and maintained for 25 minutes (3) Rosmarinic Acid Rosmarinic acid was measured by high performance liquid chromatography (HPLC).
<HPLC Analysis Conditions>
Apparatus: Agilent 1100 Series (manufactured by Agilent Technologies)
Column: ZORBAX Eclipse XDB-C18 4.6×150 mm, 5 μm (manufactured by Agilent Technologies)
Mobile phase solvents: deionized
water:acetonitrile:methanol:acetic acid=840:150:111:8.5
Flow rate: 1.0 mL/min
Detection wavelength: 340 nm (4) Carnosic Acid and Carnosol Carnosic acid and carnosol were measured by high performance liquid chromatography (HPLC).
<HPLC Analysis Conditions>
Apparatus: Agilent 1100 Series (manufactured by Agilent Technologies)
Column: Inertsil ODS-P 4.6×150 mm, 5 μm (manufactured by GL Sciences Inc.)
Mobile phase solvents: phosphoric acid aqueous
solution:acetonitrile=80:20 (0 to 40 min), acetonitrile (from 40 min)
Flow rate: 1.0 mL/min
Detection wavelength: 284 nm (5) Reduced Glutathione Reduced glutathione was measured by high performance liquid chromatography (HPLC).
<HPLC Analysis Conditions>
Apparatus: LC-20AD, SPD-20AV (SHIMADZU CORPORATION)
Column: Develosil ODS-5 (Nomura Chemical Co., Ltd.)
Mobile phase solvents: (A) 0.025 mol/L ammonium formate (pH 4.0), (B) methanol ((A):(B)=9:1 (v/v))
Flow rate of mobile phase solvents: 0.7 mL/min
Detection wavelength: 280 nm (6) Phospholipid A phospholipid was measured by a colorimetric method (as stearo-oleo-lecithin). For the procedure, a sample comprising a phospholipid was subjected to solvent extraction (chloroform:methanol=2:1) followed by dry ashing (550° C.). Then, a molybdenum blue color reagent and an ascorbic acid solution were added thereto, and the absorbance of the resultant was measured (710 nm) to obtain the amount of phosphorus.

The phospholipid was calculated from the amount of phosphorus obtained. The conversion coefficient was 25.4.

[Raw Materials]

Rapeseed oil: Nisshin rapeseed salad oil S (manufactured by The Nisshin OilliO Group, Ltd.), ALA content 9.1% by mass Fish oil: refined fish oil DHA-27 (manufactured by Nippon Suisan Kaisha, Ltd.), ALA content 1.5% by mass, total content of DHA and EPA 36.9% by mass Linseed oil: linseed oil (manufactured by Summit Oil Mill Co., Ltd.), ALA content 57.50 by mass Rosmarinic acid-containing preparation: RM-21A base (manufactured by Mitsubishi-Kagaku Foods Corporation), rosmarinic acid content 10% by mass, Carnosic acid- and carnosol-containing preparation: StabilEnhance OSR D4 (manufactured by NATUREX)

Reduced glutathione (GSH)-containing yeast: Engevita GSH (manufactured by Lallemand Inc.), reduced glutathione (GSH) content 1.0% by mass Examples 1 to 18 and Comparative Examples 1 to 5

[Preparation of Separated Liquid Dressing]

The raw materials of an aqueous phase were blended in amounts shown in Table 1, and these raw materials were stirred and mixed for dissolution to prepare the aqueous phase. Meanwhile, the raw materials of an oil phase were blended in amounts shown in Table 1, and stirred and mixed. Next, the aqueous phase was heated from room temperature, and after reaching 80° C., the aqueous phase was maintained for 4 minutes for heat treatment (sterilization treatment) and then cooled to room temperature. The pH of the aqueous phase was 3.7. Then, the oil phase was layered and filled on the aqueous phase to prepare a separated liquid seasoning. The prepared liquid seasoning was filled into a PET bottle with a lid.

[Sensory Evaluation]

A sample was stored in a dark place at 40° C. for 40 days, and then the temperature was controlled to 10° C. 7 g of the sample sufficiently shaken and mixed was added to 20 g of lettuce and eaten in the form of a cooked product. The fishy odor and herbal odor and lasting feeling of aftertaste of the cooked product were evaluated by a panel of five experts in accordance with the criteria shown below. For the "fishy odor", "herbal odor", and "lasting feeling of aftertaste", the case where the odor or the feeling was not felt was defined as 0 points. For the "fishy odor", the sensory evaluation of Comparative Example 1 was defined as 8 points (very much felt). For the "herbal odor", the evaluation of Comparative Example 2 was defined as 8 points (very much felt). For the "lasting feeling of aftertaste", the evaluation of Comparative Example 3 was defined as 8 points (very much felt). For all the Examples and the Comparative Examples described in Table 1, the score was determined by the discussion.
0: not felt
1: faintly felt
2: slightly felt
3: felt a little
4: somewhat felt
5: felt
6: considerably felt
7: much felt
8: very much felt

[Time for Oil-Water Separation after Shaking]

20 ml of a sample stored in a 30 mL-volume screw vial (made of transparent glass) with a lid in a dark place at 5° C. was shaken in a shaking machine (Direct Mixer DM-301, manufactured by AS ONE Corporation) at 3,000 r/min for 20 seconds, and then allowed to stand at 25° C. The time taken to recover the height of the aqueous phase before the shaking was measured as a time for oil-water separation (minutes).

The results are shown in Table 1.

TABLE 1

|  |  | Example 1 | Example 2 | Example 3 | Example 4 | Example 5 | Example 6 |
|---|---|---|---|---|---|---|---|
| Aqueous phase | Xanthan gum | 0.07 | 0.07 | 0.07 | 0.07 | 0.07 | 0.07 |
|  | Sugar | 5.6 | 5.6 | 5.6 | 5.6 | 5.6 | 5.6 |
|  | Common salt | 2.8 | 2.8 | 2.8 | 2.8 | 2.8 | 2.8 |
|  | Sodium glutamate | 0.42 | 0.42 | 0.42 | 0.42 | 0.42 | 0.42 |
|  | Onion | 5.6 | 5.6 | 5.6 | 5.6 | 5.6 | 5.6 |
|  | Chicken extract | 0.21 | 0.21 | 0.21 | 0.21 | 0.21 | 0.21 |
|  | Garlic | 0.35 | 0.35 | 0.35 | 0.35 | 0.35 | 0.35 |
|  | Shiitake mushroom extract | 0.35 | 0.35 | 0.35 | 0.35 | 0.35 | 0.35 |
|  | Brewed vinegar (acidity 15%) | 6.00 | 6.00 | 6.00 | 6.00 | 6.00 | 6.00 |
|  | Soy sauce | 8.400 | 8.400 | 8.400 | 8.400 | 8.400 | 8.400 |
|  | pH adjusting agent (gluconic acid) | 0.42 | 0.42 | 0.42 | 0.42 | 0.42 | 0.42 |
|  | Water | Balance | Balance | Balance | Balance | Balance | Balance |
|  | Rosmarinic acid-containing preparation | 0.007 | 0.007 | 0.007 | 0.1 | 0.1 | 0.1 |
|  | GSH-containing yeast | 0.01 | 0.1 | 0.2 | 0.01 | 0.1 | 0.2 |
| Oil phase | Soybean lecithin (Yelkin TS) | — | — | — | — | — | — |
|  | Rapeseed oil | 27 | 27 | 27 | 27 | 27 | 27 |
|  | Fish oil | 3 | 3 | 3 | 3 | 3 | 3 |
|  | Carnosic acid- and carnosol-containing preparation | — | — | — | — | — | — |
|  | Total | 100.0 | 100.0 | 100.0 | 100.0 | 100.0 | 100.0 |
|  | (A1) DHA + EPA (% by mass) | 1.1 | 1.1 | 1.1 | 1.1 | 1.1 | 1.1 |
|  | (A2) α-linolenic acid (% by mass) | 2.5 | 2.5 | 2.5 | 2.5 | 2.5 | 2.5 |
|  | (B) rosmarinic acid (ppm) | 7 | 7 | 7 | 100 | 100 | 100 |
|  | (C) reduced glutathione (ppm) | 1 | 10 | 20 | 1 | 10 | 20 |
|  | (D) phospholipid (ppm) | 0 | 0 | 0 | 0 | 0 | 0 |
|  | Carnosic acid and carnosol (ppm) | 0 | 0 | 0 | 0 | 0 | 0 |
|  | {(B) + (C)}/(A) ($\times 10^{-4}$) | 2.2 | 4.7 | 7.5 | 28.0 | 30.5 | 33.3 |
|  | {(B) + (C)}/(A1) ($\times 10^{-4}$) | 7.2 | 15.4 | 24.4 | 91.2 | 99.4 | 108.4 |
|  | {(B) + (C)}/(A2) ($\times 10^{-4}$) | 3.2 | 6.8 | 10.8 | 40.4 | 44.0 | 48.0 |
| Evaluation items | Fishy odor | 3 | 2 | 1 | 2 | 1 | 0 |
|  | Herbal odor | 0 | 0 | 0 | 1 | 1 | 1 |
|  | Lasting feeling of aftertaste | 0 | 1 | 2 | 0 | 1 | 2 |
|  | Time for oil-water separation after shaking (minutes) | 7.2 | 7.2 | 7.1 | 7.2 | 7.2 | 7.1 |

|  |  | Example 7 | Example 8 | Example 9 | Example 10 | Example 11 | Example 12 |
|---|---|---|---|---|---|---|---|
| Aqueous phase | Xanthan gum | 0.07 | 0.07 | 0.07 | 0.07 | 0.07 | 0.07 |
|  | Sugar | 5.6 | 5.6 | 5.6 | 5.6 | 5.6 | 5.6 |
|  | Common salt | 2.8 | 2.8 | 2.8 | 2.8 | 2.8 | 2.8 |
|  | Sodium glutamate | 0.42 | 0.42 | 0.42 | 0.42 | 0.42 | 0.42 |
|  | Onion | 5.6 | 5.6 | 5.6 | 5.6 | 5.6 | 5.6 |
|  | Chicken extract | 0.21 | 0.21 | 0.21 | 0.21 | 0.21 | 0.21 |
|  | Garlic | 0.35 | 0.35 | 0.35 | 0.35 | 0.35 | 0.35 |
|  | Shiitake mushroom extract | 0.35 | 0.35 | 0.35 | 0.35 | 0.35 | 0.35 |
|  | Brewed vinegar (acidity 15%) | 6.00 | 6.00 | 6.00 | 6.00 | 6.00 | 6.00 |
|  | Soy sauce | 8.400 | 8.400 | 8.400 | 8.400 | 8.400 | 8.400 |
|  | pH adjusting agent (gluconic acid) | 0.42 | 0.42 | 0.42 | 0.42 | 0.42 | 0.42 |
|  | Water | Balance | Balance | Balance | Balance | Balance | Balance |
|  | Rosmarinic acid-containing preparation | 0.2 | 0.2 | 0.2 | 0.1 | 0.1 | 0.3 |
|  | GSH-containing yeast | 0.01 | 0.1 | 0.2 | 0.1 | 0.1 | 0.2 |
| Oil phase | Soybean lecithin (Yelkin TS) | — | — | — | — | — | — |
|  | Rapeseed oil | 27 | 27 | 27 | 24 | 21 | 12 |
|  | Fish oil | 3 | 3 | 3 | 6 | 9 | 18 |
|  | Carnosic acid- and carnosol-containing preparation | — | — | — | — | — | — |
|  | Total | 100.0 | 100.0 | 100.0 | 100.0 | 100.0 | 100.0 |
|  | (A1) DHA + EPA (% by mass) | 1.1 | 1.1 | 1.1 | 2.2 | 3.3 | 6.6 |

TABLE 1-continued

|  |  |  |  |  |  |  |  |
|---|---|---|---|---|---|---|---|
|  | (A2) α-linolenic acid (% by mass) | 2.5 | 2.5 | 2.5 | 2.3 | 2 | 1.4 |
|  | (B) rosmarinic acid (ppm) | 200 | 200 | 200 | 100 | 100 | 300 |
|  | (C) reduced glutathione (ppm) | 1 | 10 | 20 | 10 | 10 | 20 |
|  | (D) phospholipid (ppm) | 0 | 0 | 0 | 0 | 0 | 0 |
|  | Carnosic acid and carnosol (ppm) | 0 | 0 | 0 | 0 | 0 | 0 |
|  | {(B) + (C)}/(A) (×10$^{-4}$) | 55.7 | 58.2 | 61.0 | 24.5 | 20.5 | 40.0 |
|  | {(B) + (C)}/(A1) (×10$^{-4}$) | 181.6 | 189.7 | 198.7 | 49.7 | 33.1 | 48.2 |
|  | {(B) + (C)}/(A2) (×10$^{-4}$) | 80.3 | 83.9 | 87.9 | 48.4 | 53.8 | 234.9 |
| Evaluation items | Fishy odor | 1 | 0 | 0 | 2 | 3 | 4 |
|  | Herbal odor | 2 | 2 | 2 | 1 | 1 | 3 |
|  | Lasting feeling of aftertaste | 0 | 1 | 2 | 1 | 1 | 2 |
|  | Time for oil-water separation after shaking (minutes) | 7.2 | 7.2 | 7.2 | 8.0 | 8.9 | 10.2 |

|  |  | Example 13 | Example 14 | Example 15 | Example 16 | Example 17 | Example 18 |
|---|---|---|---|---|---|---|---|
| Aqueous phase | Xanthan gum | 0.07 | 0.07 | 0.07 | 0.07 | 0.07 | 0.07 |
|  | Sugar | 5.6 | 5.6 | 5.6 | 5.6 | 5.6 | 5.6 |
|  | Common salt | 2.8 | 2.8 | 2.8 | 2.8 | 2.8 | 2.8 |
|  | Sodium glutamate | 0.42 | 0.42 | 0.42 | 0.42 | 0.42 | 0.42 |
|  | Onion | 5.6 | 5.6 | 5.6 | 5.6 | 5.6 | 5.6 |
|  | Chicken extract | 0.21 | 0.21 | 0.21 | 0.21 | 0.21 | 0.21 |
|  | Garlic | 0.35 | 0.35 | 0.35 | 0.35 | 0.35 | 0.35 |
|  | Shiitake mushroom extract | 0.35 | 0.35 | 0.35 | 0.35 | 0.35 | 0.35 |
|  | Brewed vinegar (acidity 15%) | 6.00 | 6.00 | 6.00 | 6.00 | 6.00 | 6.00 |
|  | Soy sauce | 8.400 | 8.400 | 8.400 | 8.400 | 8.400 | 8.400 |
|  | pH adjusting agent (gluconic acid) | 0.42 | 0.42 | 0.42 | 0.42 | 0.42 | 0.42 |
|  | Water | Balance | Balance | Balance | Balance | Balance | Balance |
|  | Rosmarinic acid-containing preparation | 0.1 | 0.1 | 0.1 | 0.1 | 0.3 | 0.3 |
|  | GSH-containing yeast | 0.01 | 0.01 | 0.01 | 0.01 | 0.2 | 0.2 |
| Oil phase | Soybean lecithin (Yelkin TS) | 0.0012 | 0.0023 | 0.0046 | 0.0070 | — | — |
|  | Rapeseed oil | 27 | 27 | 27 | 27 | 12 | 12 |
|  | Fish oil | 3 | 3 | 3 | 3 | 18 | 18 |
|  | Carnosic acid- and carnosol-containing preparation | — | — | — | — | 0.001 | 0.05 |
|  | Total | 100.0 | 100.0 | 100.0 | 100.0 | 100.0 | 100.0 |
|  | (A1) DHA + EPA (% by mass) | 1.1 | 1.1 | 1.1 | 1.1 | 6.6 | 6.6 |
|  | (A2) α-linolenic acid (% by mass) | 2.5 | 2.5 | 2.5 | 2.5 | 1.4 | 1.4 |
|  | (B) rosmarinic acid (ppm) | 100 | 100 | 100 | 100 | 300 | 300 |
|  | (C) reduced glutathione (ppm) | 1 | 1 | 1 | 1 | 20 | 20 |
|  | (D) phospholipid (ppm) | 5 | 10 | 20 | 30 | 0 | 0 |
|  | Carnosic acid and carnosol (ppm) | 0 | 0 | 0 | 0 | 0.5 | 24.3 |
|  | {(B) + (C)}/(A) (×10$^{-4}$) | 28.0 | 28.0 | 28.0 | 28.0 | 40.0 | 40.0 |
|  | {(B) + (C)}/(A1) (×10$^{-4}$) | 91.2 | 91.2 | 91.2 | 91.2 | 48.2 | 48.2 |
|  | {(B) + (C)}/(A2) (×10$^{-4}$) | 40.4 | 40.4 | 40.4 | 40.4 | 234.9 | 234.9 |
| Evaluation items | Fishy odor | 0 | 0 | 3 | 4 | 3 | 1 |
|  | Herbal odor | 1 | 1 | 1 | 1 | 3 | 4 |
|  | Lasting feeling of aftertaste | 0 | 0 | 0 | 0 | 2 | 2 |
|  | Time for oil-water separation after shaking (minutes) | 5.3 | 4.2 | 7.0 | 12.7 | 10.0 | 10.1 |

|  |  | Comparative Example 1 | Comparative Example 2 | Comparative Example 3 | Comparative Example 4 | Comparative Example 5 |
|---|---|---|---|---|---|---|
| Aqueous phase | Xanthan gum | 0.07 | 0.07 | 0.07 | 0.07 | 0.07 |
|  | Sugar | 5.6 | 5.6 | 5.6 | 5.6 | 5.6 |
|  | Common salt | 2.8 | 2.8 | 2.8 | 2.8 | 2.8 |
|  | Sodium glutamate | 0.42 | 0.42 | 0.42 | 0.42 | 0.42 |
|  | Onion | 5.6 | 5.6 | 5.6 | 5.6 | 5.6 |
|  | Chicken extract | 0.21 | 0.21 | 0.21 | 0.21 | 0.21 |
|  | Garlic | 0.35 | 0.35 | 0.35 | 0.35 | 0.35 |
|  | Shiitake mushroom extract | 0.35 | 0.35 | 0.35 | 0.35 | 0.35 |

TABLE 1-continued

|  |  |  |  |  |  |  |
|---|---|---|---|---|---|---|
|  | Brewed vinegar (acidity 15%) | 6.00 | 6.00 | 6.00 | 6.00 | 6.00 |
|  | Soy sauce | 8.400 | 8.400 | 8.400 | 8.400 | 8.400 |
|  | pH adjusting agent (gluconic acid) | 0.42 | 0.42 | 0.42 | 0.42 | 0.42 |
|  | Water | Balance | Balance | Balance | Balance | Balance |
|  | Rosmarinic acid-containing preparation | — | 0.5 | — | 0.1 | 0.1 |
|  | GSH-containing yeast | — | — | 0.4 | 0.01 | 0.01 |
| Oil phase | Soybean lecithin (Yelkin TS) | — | — | — | 0.0116 | 0.0163 |
|  | Rapeseed oil | 27 | 27 | 27 | 27 | 27 |
|  | Fish oil | 3 | 3 | 3 | 3 | 3 |
|  | Carnosic acid- and carnosol-containing preparation | — | — | — | — | — |
|  | Total | 100.0 | 100.0 | 100.0 | 100.0 | 100.0 |
| (A1) DHA + EPA (% by mass) |  | 1.1 | 1.1 | 1.1 | 1.1 | 1.1 |
| (A2) α-linolenic acid (% by mass) |  | 2.5 | 2.5 | 2.5 | 2.5 | 2.5 |
| (B) rosmarinic acid (ppm) |  | 0 | 500 | 0 | 100 | 100 |
| (C) reduced glutathione (ppm) |  | 0 | 0 | 40 | 1 | 1 |
| (D) phospholipid (ppm) |  | 0 | 0 | 0 | 50 | 70 |
| Carnosic acid and carnosol (ppm) |  | 0 | 0 | 0 | 0 | 0 |
| {(B) + (C)}/(A) (×$10^{-4}$) |  | — | — | — | 28.0 | 28.0 |
| {(B) + (C)}/(A1) (×$10^{-4}$) |  | — | — | — | 91.2 | 91.2 |
| {(B) + (C)}/(A2) (×$10^{-4}$) |  | — | — | — | 40.4 | 40.4 |
| Evaluation items | Fishy odor | 8 | 1 | 3 | 5 | 6 |
|  | Herbal odor | 0 | 8 | 0 | 1 | 1 |
|  | Lasting feeling of aftertaste | 0 | 0 | 8 | 0 | 0 |
|  | Time for oil-water separation after shaking (minutes) | 7.2 | 7.2 | 7.2 | 23.3 | 26.3 |

Examples 19 to 24 and Comparative Examples 6 to 7

[Preparation of Separated Liquid Dressing]

A separated liquid dressing was prepared in the same manner as in Example 1 described above.

[Sensory Evaluation and Time for Oil-Water Separation after Shaking]

Sensory evaluation was carried out in the same manner as in the method described above, except that the deterioration odor derived from linseed oil was evaluated instead of the "fishy odor". For the "deterioration odor derived from linseed oil", the sensory evaluation of Comparative Example 6 was defined as 8 points (very much felt).

In addition, the time for oil-water separation (minutes) was measured by the same manner as in the method described above.

The results are shown in Table 2.

TABLE 2

|  |  | Example 19 | Example 20 | Example 21 | Example 22 | Example 23 | Example 24 | Comparative Example 6 | Comparative Example 7 |
|---|---|---|---|---|---|---|---|---|---|
| Aqueous phase | Xanthan gum | 0.07 | 0.07 | 0.07 | 0.07 | 0.07 | 0.07 | 0.07 | 0.07 |
|  | Sugar | 5.6 | 5.6 | 5.6 | 5.6 | 5.6 | 5.6 | 5.6 | 5.6 |
|  | Common salt | 2.8 | 2.8 | 2.8 | 2.8 | 2.8 | 2.8 | 2.8 | 2.8 |
|  | Sodium glutamate | 0.42 | 0.42 | 0.42 | 0.42 | 0.42 | 0.42 | 0.42 | 0.42 |
|  | Onion | 5.6 | 5.6 | 5.6 | 5.6 | 5.6 | 5.6 | 5.6 | 5.6 |
|  | Chicken extract | 0.21 | 0.21 | 0.21 | 0.21 | 0.21 | 0.21 | 0.21 | 0.21 |
|  | Garlic | 0.35 | 0.35 | 0.35 | 0.35 | 0.35 | 0.35 | 0.35 | 0.35 |
|  | Shiitake mushroom extract | 0.35 | 0.35 | 0.35 | 0.35 | 0.35 | 0.35 | 0.35 | 0.35 |
|  | Brewed vinegar (acidity 15%) | 6.00 | 6.00 | 6.00 | 6.00 | 6.00 | 6.00 | 6.00 | 6.00 |
|  | Soy sauce | 8.400 | 8.400 | 8.400 | 8.400 | 8.400 | 8.400 | 8.400 | 8.400 |
|  | pH adjusting agent (gluconic acid) | 0.42 | 0.42 | 0.42 | 0.42 | 0.42 | 0.42 | 0.42 | 0.42 |
|  | Water | Balance | Balance | Balance | Balance | Balance | Balance | Balance | Balance |
|  | Rosmarinic acid-containing preparation | 0.1 | 0.1 | 0.1 | 0.1 | 0.1 | 0.1 | — | 0.1 |
|  | GSH-containing yeast | 0.01 | 0.01 | 0.01 | 0.01 | 0.01 | 0.01 | — | 0.01 |

TABLE 2-continued

|  |  | Example 19 | Example 20 | Example 21 | Example 22 | Example 23 | Example 24 | Comparative Example 6 | Comparative Example 7 |
|---|---|---|---|---|---|---|---|---|---|
| Oil phase | Soybean lecithin (Yelkin TS) | — | — | — | — | — | — | — | 0.0163 |
|  | Rapeseed oil | 27 | 21 | 15 | 9 | 0 | 0 | 27 | 27 |
|  | Linseed oil | 3 | 9 | 15 | 21 | 30 | 30 | 3 | 3 |
|  | Carnosic acid- and carnosol-containing preparation | — | — | — | — | — | 0.05 | — | — |
|  | Total | 100.0 | 100.0 | 100.0 | 100.0 | 100.0 | 100.0 | 100.0 | 100.0 |
| (A1) DHA + EPA (% by mass) |  | 0 | 0 | 0 | 0 | 0 | 0 | 0 | 0 |
| (A2) α-linolenic acid (% by mass) |  | 4.2 | 7.1 | 10 | 12.9 | 17.3 | 17.3 | 4.2 | 4.2 |
| (B) rosmarinic acid (ppm) |  | 100 | 100 | 100 | 100 | 100 | 100 | 0 | 100 |
| (C) reduced glutathione (ppm) |  | 1 | 1 | 1 | 1 | 1 | 1 | 0 | 1 |
| (D) phospholipid (ppm) |  | 0 | 0 | 0 | 0 | 0 | 0 | 0 | 70 |
| Carnosic acid and carnosol (ppm) |  | 0 | 0 | 0 | 0 | 0 | 24.3 | 0 | 0 |
| {(B) + (C)}/(A2) (×10$^{-4}$) |  | 24.2 | 14.3 | 10.1 | 7.8 | 5.9 | 5.9 | — | 24.2 |
| Evaluation items | Deterioration odor derived from linseed oil | 0 | 0 | 1 | 2 | 3 | 1 | 8 | 5 |
|  | Herbal odor | 1 | 1 | 1 | 1 | 1 | 2 | 0 | 1 |
|  | Lasting feeling of aftertaste | 0 | 0 | 0 | 0 | 0 | 0 | 0 | 0 |
|  | Time for oil-water separation after shaking (minutes) | 6.6 | 7.9 | 9.9 | 11.5 | 11.5 | 11.5 | 6.8 | 23.2 |

As is apparent from Table 1 and Table 2, the products of the present invention, in which rosmarinic acid and reduced glutathione were blended, had a less fishy odor and a less deterioration odor derived from linseed oil and a less herbal odor and also a less lasting feeling of aftertaste after the storage than those of the comparative products. In addition, the separated state of the oil phase and the aqueous phase was maintained after the separated liquid seasonings were shaken.

In contrast, for Comparative Examples 1 to 3 and 6, in which rosmarinic acid and reduced glutathione were not blended, with the storage, the taste and flavor deteriorated, the herbal odor was strongly felt, and the aftertaste remained. In addition, for Comparative Examples 4, 5, and 7, in which the phospholipid was contained in an amount larger than the predetermined amount, the deterioration proceeded to generate the fishy odor and the deterioration odor derived from linseed oil strongly. Further, the time taken for the oil phase and the aqueous phase to separate after the separated liquid seasonings were shaken was long, and the separated liquid seasonings were less likely to return to the phase-separated state.

The invention claimed is:

1. A separated liquid seasoning comprising the following components (A), (B), and (C) blended therein:
   (A) an ω3 fatty acid derived from a fat or oil, in an amount of 3 to 20% by mass;
   (B) rosmarinic acid, wherein an amount of (B) rosmarinic acid blended is from 1 to 400 ppm; and
   (C) a reduced glutathione, wherein an amount of (C) reduced glutathione blended is from 0.1 to 30 ppm,
   wherein (D) a phospholipid is blended in an amount of 40 ppm or less in the separated liquid seasoning,
   wherein said separated liquid seasoning has an oil phase and an aqueous phase which are present in a separated state, and
   wherein the pH of the aqueous phase of the separated liquid seasoning is 5.5 or less said pH being adjusted by adding at least one component selected from the group consisting of an acidulant, an organic acid, an inorganic acid, and lemon fruit juice.

2. The separated liquid seasoning according to claim 1, wherein a time for oil-water separation after shaking is 15 minutes or less.

3. The separated liquid seasoning according to claim 1, comprising substantially no emulsifier other than the phospholipid.

4. The separated liquid seasoning according to claim 1, wherein (A) the ω3 fatty acid derived from the fat or oil comprises one or more selected from the group consisting of α-linolenic acid, eicosapentaenoic acid, and docosahexaenoic acid.

5. The separated liquid seasoning according to claim 1, wherein an amount of (B) rosmarinic acid blended is from 10 to 390 ppm.

6. The separated liquid seasoning according to claim 1, wherein an amount of (C) the reduced glutathione blended is from 0.5 to 20 ppm.

7. The separated liquid seasoning according to claim 4, wherein a total amount blended of (A) eicosapentaenoic acid and docosahexaenoic acid derived from a fat or oil is from 0.1 to 8% by mass.

8. The separated liquid seasoning according to claim 4, wherein an amount blended of (A) α-linolenic acid derived from a fat or oil is from 0.1 to 20% by mass.

9. The separated liquid seasoning according to claim 1, wherein a mass ratio of a total amount blended of (B) rosmarinic acid and (C) the reduced glutathione to an amount blended of (A) the ω3 fatty acid derived from the fat or oil, [{(B)+(C)}/(A)], is in a range of $1 \times 10^{-4}$ to $100 \times 10^{-4}$.

10. The separated liquid seasoning according to claim 1, further comprising from 0.1 to 40 ppm of carnosic acid, carnosol, or a combination thereof.

11. A method for producing a separated liquid seasoning, the method comprising blending (A) an ω3 fatty acid derived from a fat or oil, (B) rosmarinic acid, wherein an amount of (B) rosmarinic acid blended is from 1 to 400 ppm, and (C) a reduced glutathione, wherein an amount of (C) reduced glutathione blended is from 0.1 to 30 ppm, and (D) optionally a phospholipid,
   wherein an amount of (A) blended is from 3 to 20% by mass based on a total mass of all raw materials blended, and an amount of (D) blended is 40 ppm or less based on the total mass of all raw materials blended, wherein said separated liquid seasoning has an oil phase and an aqueous phase which are present in a separated state, and wherein the pH of the aqueous phase of the separated liquid seasoning is 5.5 or less.

12. The separated liquid seasoning according to claim 1, wherein when (A) comprises eicosapentaenoic acid and docosahexaenoic acid, an amount of (B) rosmarinic acid blended is 1 ppm or more and 300 ppm or less.

13. The separated liquid seasoning according to claim 1, wherein when (A) does not comprise eicosapentaenoic acid and docosahexaenoic acid, an amount of (B) rosmarinic acid blended is 50 ppm or more and 150 ppm or less.

14. The separated liquid seasoning according to claim 1, wherein when (A) comprises eicosapentaenoic acid and docosahexaenoic acid, a mass ratio of a total amount blended of (B) rosmarinic acid and (C) the reduced glutathione in the separated liquid seasoning to the amount blended of (A) the ω3 fatty acid derived from the fat or oil, in the separated liquid seasoning, $[\{(B)+(C)\}/(A)]$, is $1\times10^{-4}$ or more and $70\times10^{-4}$ or less.

15. The separated liquid seasoning according to claim 1, wherein when (A) comprises eicosapentaenoic acid and docosahexaenoic acid, a mass ratio of the total amount blended of (B) rosmarinic acid and (C) the reduced glutathione in the separated liquid seasoning to a total amount blended of (A1) eicosapentaenoic acid and docosahexaenoic acid derived from the fat or oil, in the separated liquid seasoning, $[\{(B)+(C)\}/(A1)]$, is $5\times10^{-4}$ or more and $200\times10^{-4}$ or less.

16. The separated liquid seasoning according to claim 1, wherein when (A) comprises eicosapentaenoic acid and docosahexaenoic acid, a mass ratio of the total amount blended of (B) rosmarinic acid and (C) the reduced glutathione in the separated liquid seasoning to an amount blended of (A2) α-linolenic acid derived from the fat or oil, in the separated liquid seasoning, $[\{(B)+(C)\}/(A2)]$, is $3\times10^{-4}$ or more and $250\times10^{-4}$ or less.

17. The separated liquid seasoning according to claim 1, wherein when (A) does not comprise eicosapentaenoic acid and docosahexaenoic acid, a mass ratio of the total amount blended of (B) rosmarinic acid and (C) the reduced glutathione in the separated liquid seasoning to the amount blended of (A) the ω3 fatty acid derived from the fat or oil, in the separated liquid seasoning, $[\{(B)+(C)\}/(A)]$, is $5\times10^{-4}$ or more and $25\times10^{-4}$ or less.

18. The separated liquid seasoning according to claim 1, wherein the amount of (D) the phospholipid blended is 20 ppm or less.

19. The separated liquid seasoning according to claim 1, wherein the pH of the aqueous phase of the separated liquid seasoning is 2.5 to 5.5.

20. The separated liquid seasoning according to claim 1, wherein the pH of the aqueous phase of the separated liquid seasoning is 3 to 5.

21. The separated liquid seasoning according to claim 1, wherein the pH of the aqueous phase of the separated liquid seasoning is 3.2 to 4.5.

* * * * *